(12) United States Patent
Brault

(10) Patent No.: US 9,326,567 B2
(45) Date of Patent: May 3, 2016

(54) MULTI-ADAPTABLE POWER AUTOMATED TRACTION APPARATUS

(71) Applicant: Jean Brault, Cowansville (CA)

(72) Inventor: Jean Brault, Cowansville (CA)

(*) Notice: Subject to any disclaimer, the term of this patent is extended or adjusted under 35 U.S.C. 154(b) by 0 days.

(21) Appl. No.: 14/120,857

(22) Filed: Jul. 7, 2014

(65) Prior Publication Data

US 2014/0319814 A1 Oct. 30, 2014

Related U.S. Application Data

(63) Continuation-in-part of application No. 13/068,829, filed on May 23, 2011, now abandoned.

(51) Int. Cl.
| | | |
|---|---|---|
| *A43C 15/14* | (2006.01) | |
| *A63C 7/10* | (2006.01) | |
| *A43B 3/00* | (2006.01) | |
| *A43B 5/04* | (2006.01) | |

(Continued)

(52) U.S. Cl.
CPC .............. *A43C 15/14* (2013.01); *A43B 3/0015* (2013.01); *A43B 5/0411* (2013.01); *A43B 5/0496* (2013.01); *A63C 7/005* (2013.01); *A63C 7/1086* (2013.01); *A63C 9/0807* (2013.01); *A63C 2203/12* (2013.01); *A63C 2203/22* (2013.01); *B62M 2027/025* (2013.01)

(58) Field of Classification Search
CPC ............ A63C 7/00; A63C 7/005; A63C 7/10; A63C 7/1013; A63C 7/1046; A63C 7/1053; A63C 7/1086; A43C 15/06; A43C 15/061; A43C 15/063; A43C 15/065; A43C 15/066; A43C 15/14; A43C 15/062

USPC .............. 280/604, 605, 606, 607, 809, 28.11; 188/5, 8, 32; 36/59.2, 61, 62, 132, 134, 36/135, 59 R

See application file for complete search history.

(56) References Cited

U.S. PATENT DOCUMENTS

| | | | | | |
|---|---|---|---|---|---|
| 2,107,363 | A | * | 2/1938 | Binder | ...................... A63C 7/08 134/67 |
| 4,911,461 | A | * | 3/1990 | Humphrey | ............. A63C 11/00 188/5 |

(Continued)

OTHER PUBLICATIONS

Naseem Daher, Chuang Wang, and Monnika Ivantysynova, Novel Energy-Saving Steer-by Wire System for Articulated Steering Vehicales: Study, Jun. 3-5, 2013 Indiana USA.

(Continued)

*Primary Examiner* — John Walters

(57) ABSTRACT

Systems for producing traction, wherein each traction system is an apparatus that provides traction on snow and ice covered surfaces.

A pair of Back Country skis each are mounted with an apparatus; having DC powered controls, tilt switch, pressurized carbon dioxide ($CO_2$) gas powered pneumatic actuators operating gripping parts; controlled by a servo unit. A pair of foot wear (hiking boots) having a DC powered servo-solenoid-valve units controlling pressurized $CO_2$, gas powering pneumatic rotors, operating, hydraulic pumps, actuators with gripping parts. A pair of snowmobile skis each having an assembly of parts; driven by an hydraulic rotor that pivots the skis, adjusting their position when cornering, providing traction, according to a snowmobile steering system. And is powered and controlled by at least one of: hydraulic steering system, an electro-hydraulic steering system; an electric power steering system using an electric motor instead of hydraulic rotor.

5 Claims, 7 Drawing Sheets

(51) Int. Cl.
*A63C 7/00* (2006.01)
*B62M 27/02* (2006.01)
*A63C 9/08* (2012.01)

(56) References Cited

U.S. PATENT DOCUMENTS

| | | | | |
|---|---|---|---|---|
| 4,986,561 | A * | 1/1991 | Humphrey | A63C 11/00 280/605 |
| 5,497,565 | A * | 3/1996 | Balgin | A43C 15/14 36/134 |
| 5,557,865 | A * | 9/1996 | Sjosvard | A43C 15/14 36/134 |
| 6,449,880 | B1 * | 9/2002 | Calabrese | A43C 15/14 36/61 |
| 7,490,418 | B2 * | 2/2009 | Obeydani | A43C 15/14 36/61 |
| 2004/0140637 | A1 * | 7/2004 | Cook | A63C 5/06 280/28.11 |

OTHER PUBLICATIONS

Hydraproducts Limited Gloucestershire UK, Jan. 9, 2003.

* cited by examiner

US 9,326,567 B2

MULTI-ADAPTABLE POWER AUTOMATED TRACTION APPARATUS

This is a Continuation in part of, U.S. application Ser. No. 13/068,829 Dated: May 23, 2011

BACKGROUND OF THE INVENTION

1. Field of the Invention

The present invention relates to a ice and snow traction apparatus that is adaptable to back country skis, foot wears, and snowmobile skis using; three separate systems to obtain the desired traction apparatus adapted for each back country skis, foot wears, and snowmobile skis.

2. Description of the Related Art

Innovations in the field of hydraulic power and more specifically micro hydraulic power units. One such company "HYDRAPRODUCTS LIMITED" based in Gloucestershire UK. And included here as reference. Has for example; very small DC powered hydraulic Micro reversible power packs. The need for miniaturirization in many sectors of industry is a ever growing reality in a global economy. Many new products can only come about, and in many instances only possible; if manufactured technologies are made smaller, yet retain performance and reliability. Therefore hydraulic power technologies have many years of experience, and dependability. The same can be said for gas pneumatic powered technologies that have sized down parts, and are performance proven.

Winter sport technologies can benefit greatly with both hydraulic and pneumatic parts, now that there is a growing need for smaller technologies. Robotic is an other field that can benefit from small hydraulics, and small pneumatics parts.

An other field of technologies that robotics can benefit from is combining hydraulics, pneumatics, with interface broadband communication applications.

In an other aspect about hydraulics, concerning power steering systems, when electric power steering systems are pressing to compete with hydraulic power steering systems.

A combination of electro-hydraulic systems are also evolving; one such example is described in: "the 13th Scandinavian International Conference on Fluid Power, SICFP2013, Jun. 3-5, 2013, Linkoping, Sweden (NOVEL ENERGY-SAVING-STEER-BY-WIRE SYSTEM FOR ARTICULATED STEERING VEHICLES: A COMPACT WHEEL LOADER CASE STUDY), Naseem Daher, Chuang Wang, and Monika Ivantysynova. School of Mechanical engineering, Purdue University, West Lafayette, Ind., USA."

And included here as reference.

Snowmobiles have benefited greatly from new technologies in recent years; yet traction remains a problem, when turning a snowmobile especially on hard packed snow, and ice conditions; and even more so at higher speeds. Snowmobile skis tend to sheer in these condition; or if turning a sharp curve. Here again speed is a factor.

Or when turning in a slanted position on a slope. Some remedy for these problems is for the snowmobile driver to lean into the curve. What is needed is a Snowmobile more suitably adapted to cut a curve (follow a curved trajectory line) and maintain more consistency with an inbounds center of gravity; then would a conventional snowmobile directional system. The stability of the snowmobile would also improved with the present embodiment since both skis of a snowmobile are leaning into the curve helping to keep the center of gravity from shifting all its pressure to the outward ski, causing an improved equilibrium of gravity between both skis. And therefore greater traction.

SUMMARY OF THE INVENTION

The present invention relates to traction means; that are provided for back country skis, and for hiking boots, and for a pair of snowmobile skis; for gaining traction on snow and ice covered surfaces.

In one aspect of the present invention, a light weight system, forming a self sufficient traction apparatus for back country skis used for climbing. Pressurized $CO_2$ gas (incoming from a small cartridge), is used to power a pneumatic system for automating a gripping part. Using a tilt sensor as a switch for a DC powered servo-solenoid valve. No need to push buttons or transmitters for traction, or retraction; since the adjustable tilt sensor does so automatically. If the skis are ascending, then that deploys gripping part. Or if the skis are descending, or in a horizontal positions; then the gas supply is cut off by the solenoid valve; and the gripping part using only mechanical parts retracts.

In an other aspect; a pair of hiking boots are equipped with traction parts that deploy and retract; and that are controlled from an exterior incoming radio frequency transmitter that can come from many different sources. For example, computer module, mobile phone, radio frequency transmitter. The boots can also be equipped with an on off switch. A receiver-servo-control-solenoid valves unit, that is DC powered; and a multi-solenoid valve unit to operate controls. Pressurized $CO_2$ gas (incoming from a small cartridge) to power a gas pneumatic rotary actuators that operate oil hydraulics pumps, and oil hydraulic actuators for deploying gripping parts and retracting them.

Yet in an other aspect, a pair of snowmobile skis using oil hydraulic rotary actuators or electric motors to operate a snowmobile skis traction apparatus; that are connected and controlled by the power steering system, of a snowmobile. The pair of skis pivot around a drive shaft that brings the skis to an angle, when turning; producing the traction.

The apparatus can adapt to an electro-hydraulic steering system. Or an electric power steering system; by using the electric motor; as part of the apparatus instead of the hydraulic rotary actuator.

DETAIL DESCRIPTION OF THE INVENTION

The Present Invention is Described with Reference to the Drawings

Figure 2:
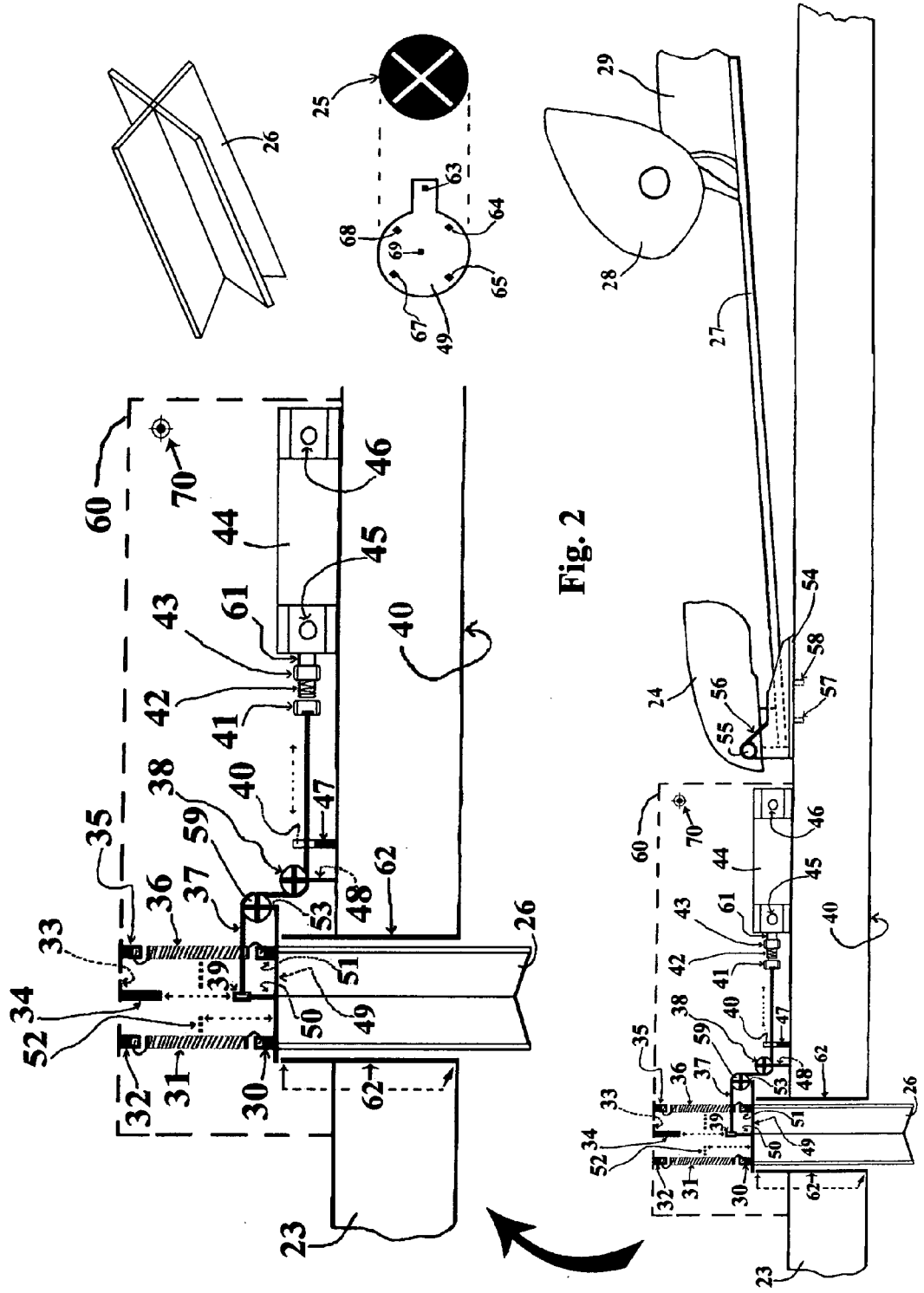
FIG. 2 shows an exploded cross-sectional view of a back country ski having a traction apparatus; with an enlarged image of the traction apparatus above, and the gripping part and fixing plate to the right.
Figure 3:
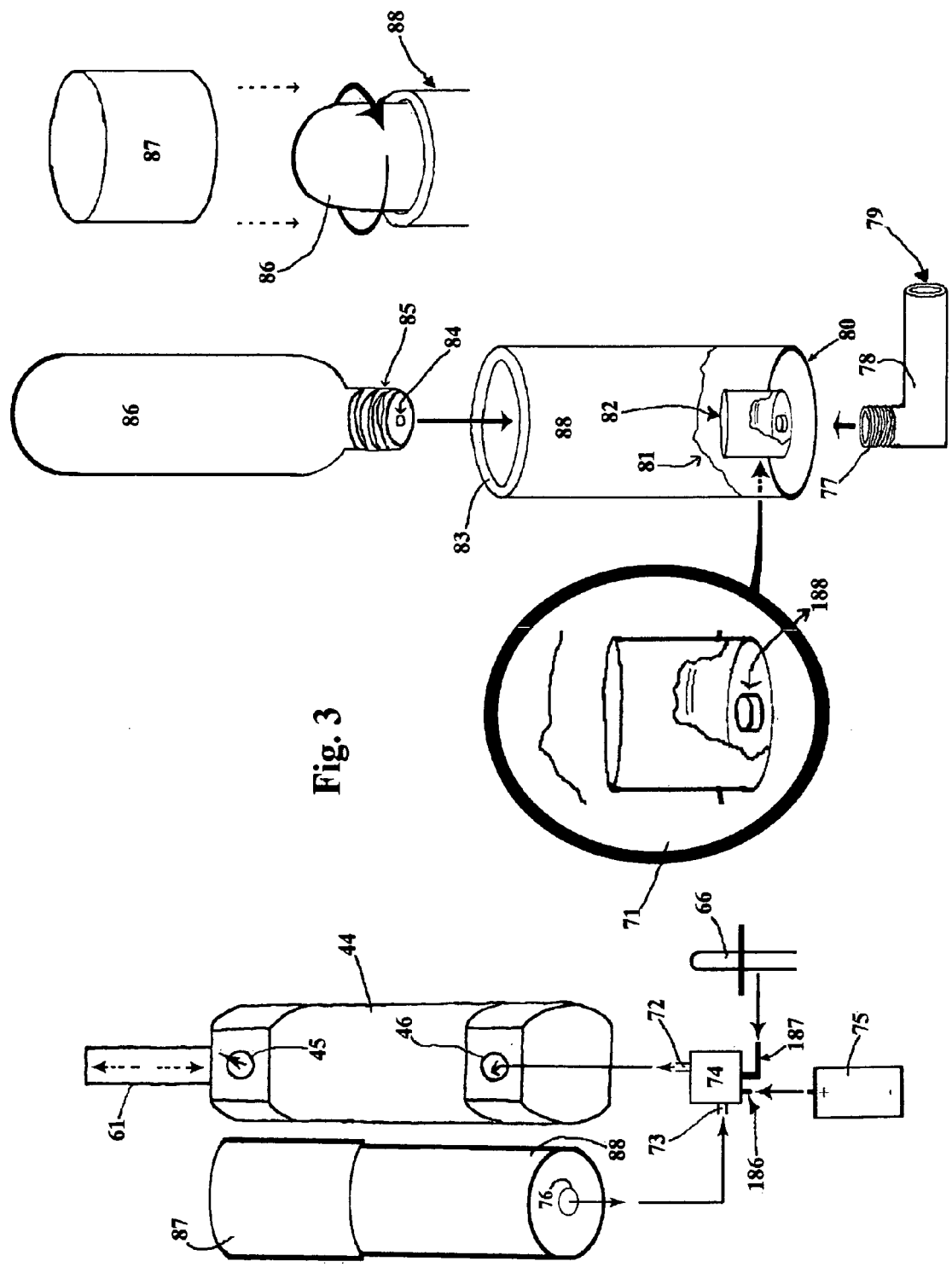
FIG. 3 shows an exploded cross-sectional view of a gas pneumatic actuator and parts set up(left), for the back country ski to (FIG. 2); a pressurized Carbon dioxide $CO_2$ gas cartridge 86, with an ensemble of related parts from (center to right) used for the ski to (FIG. 2), and similarly used for a boot to (FIG. 4), and (FIG. 5).
Figure 4:
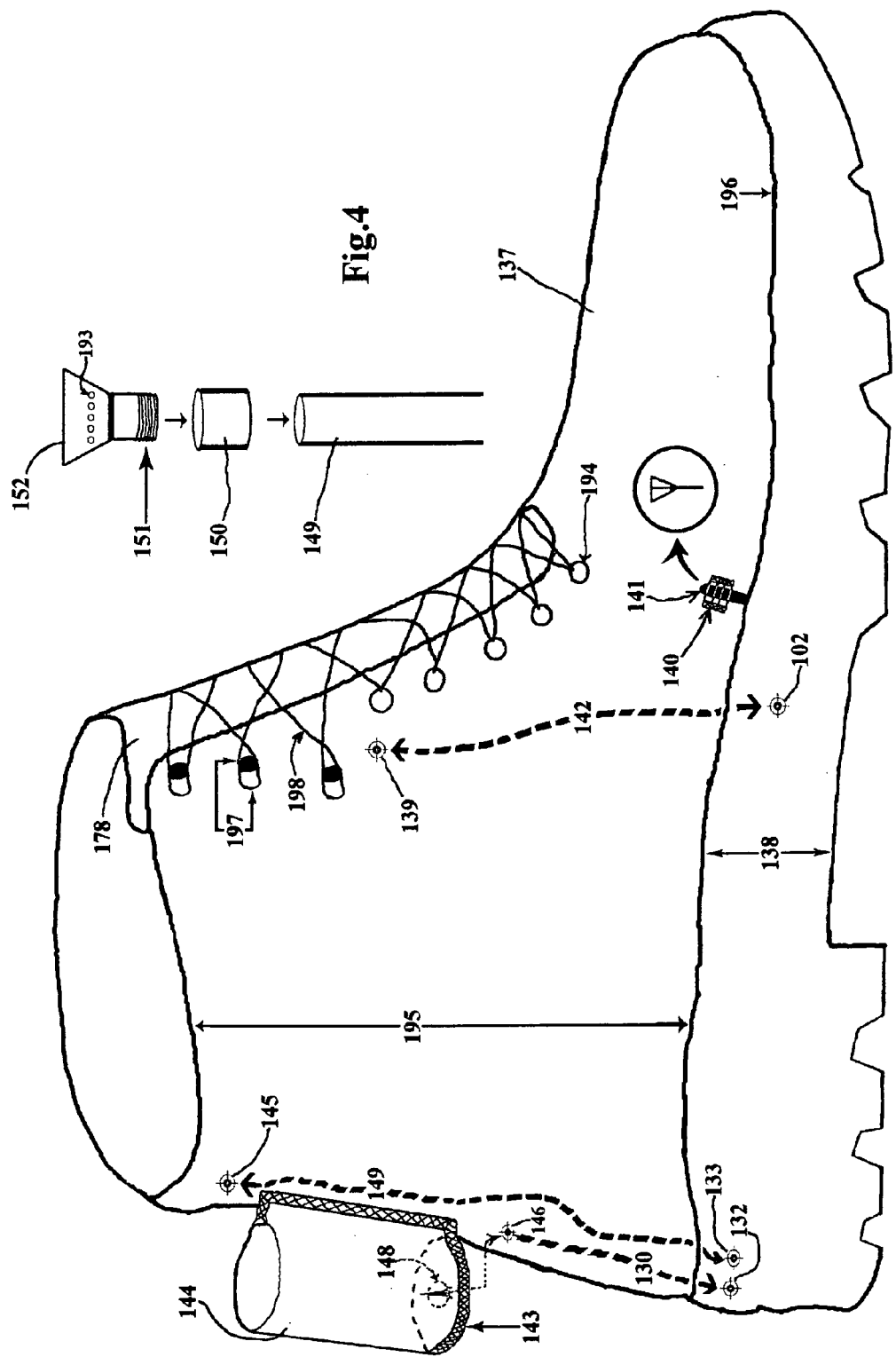
FIG. 4 shows an exploded cross-sectional view of the inward side of a left hiking boot; having a carrying compartment (left) a receivers antenna (lower right); hydraulic air vent cap (filler breather) with tube parts (top right); doted lines with target signs.
Figure 5:
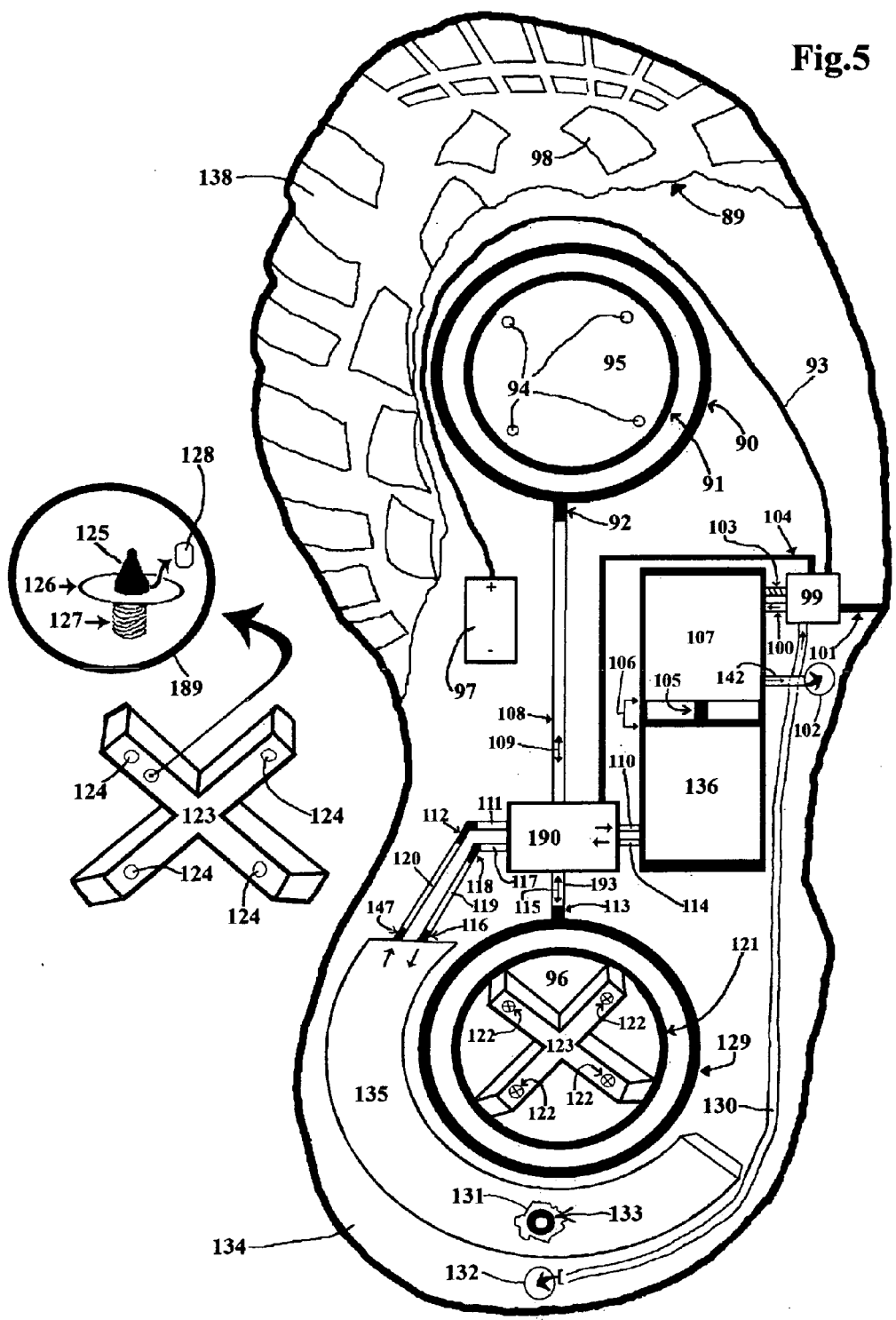
FIG. 5 an exploded cross-sectional fractured view showing the underside, and inside of the outsole 138, of the left boot 137 to (FIG. 4); with an ensemble of components that are part of the traction apparatus of boot 137 to (FIG. 4); a traction part (left) of outsole 138.

To provide a certain order and steps, and help the viewer save time and have a clear understanding; FIG. 2, FIG. 4, FIG. 5; are explained alongside to FIG. 3; that describes parts for using pressurized carbon dioxide $CO_2$ gas; and the components therein. The traction apparatus described to FIG. 4, and FIG. 5, uses some parts to FIG. 3; comprising: cartridge 86, cartridge holder 88, and rubber cover 87, and pneumatic elbow treaded-to-tube adapter 78; as does similarly the traction apparatus described to FIG. 2.

Figure 1:
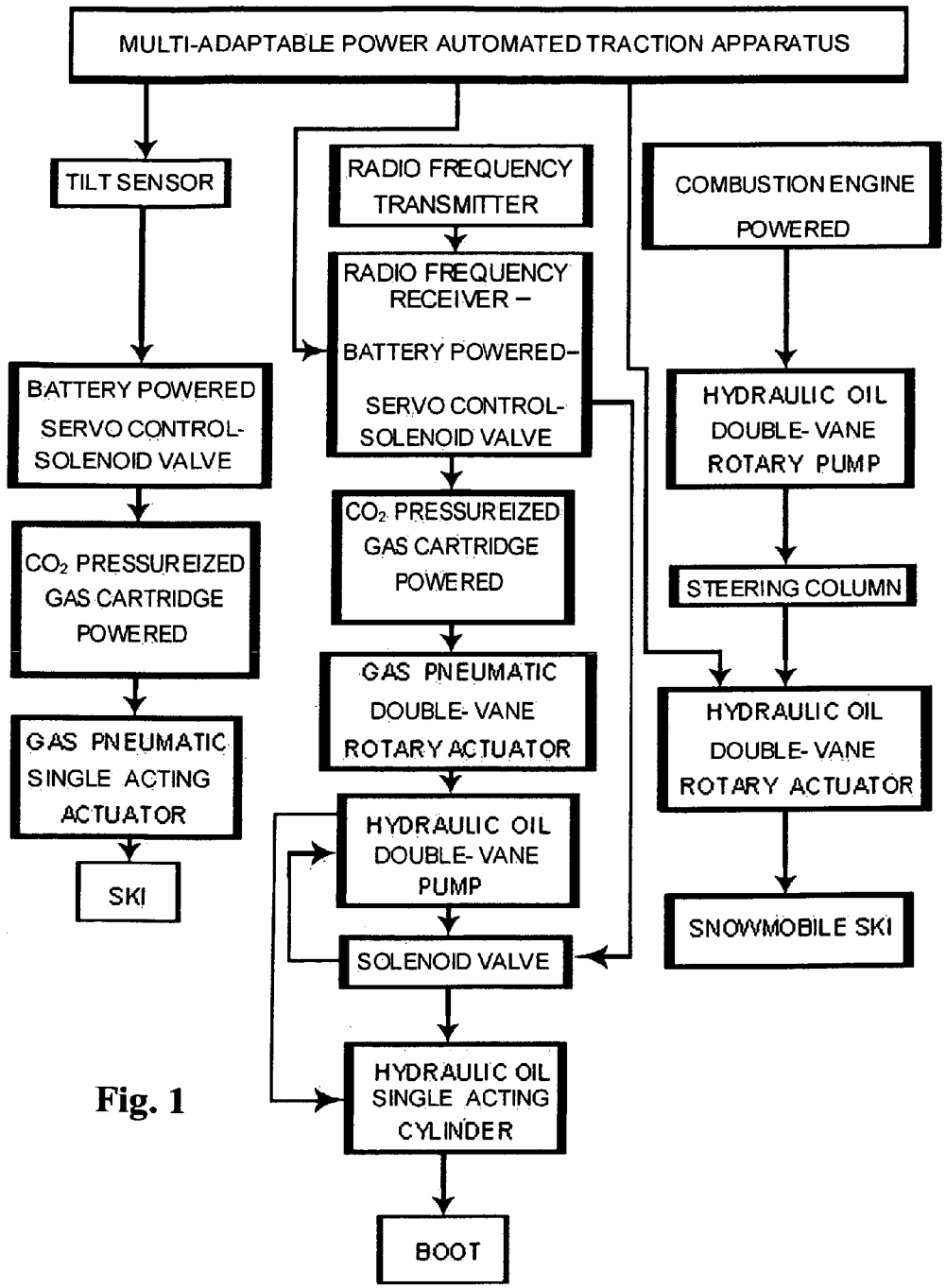
FIG. 1 is a block diagram containing writing describing the basics of a multi adaptable power-automated traction apparatus; for a ski, for a boot, and for a snowmobile ski.

FIG. 1, shows a rectangle box containing the title of the invention linked to three vertical columns of inter-connected boxes (identified by a line or arrow). Each said column describes a specific adaptable power-automated traction systems of the apparatus; yet each system (related to column) retains the use of at least one of, gas pneumatic, oil hydraulic components; to automate and operate the apparatus.

The first column to the left describes the basic components needed to provide power automated traction for skis. Preferably used for climbing on snow and ice covered surfaces (terrain) with a pair of back-country skis. Although it could in the same way be adapted for climbing using a pair of cross-country skis (not shown).

The center column describes the basic components needed to provide power automated traction for a pair of hiking boots used on ice and ice covered snow surfaces, (terrain). In the present embodiment the foot wear described is a hiking boot; although the system can be adapted in the same way for shoe(s) (not shown).

The third column to the right describes the basic components needed to provide power automated traction for snowmobile skis, that allows a pair of snowmobile skis to run parallel with a curved trajectory line when turning (cornering) as they pivot accordingly with the position of a handlebars steering shaft of a snowmobile; to provide greater traction on snow and ice surfaces (terrain.

Figure 6:
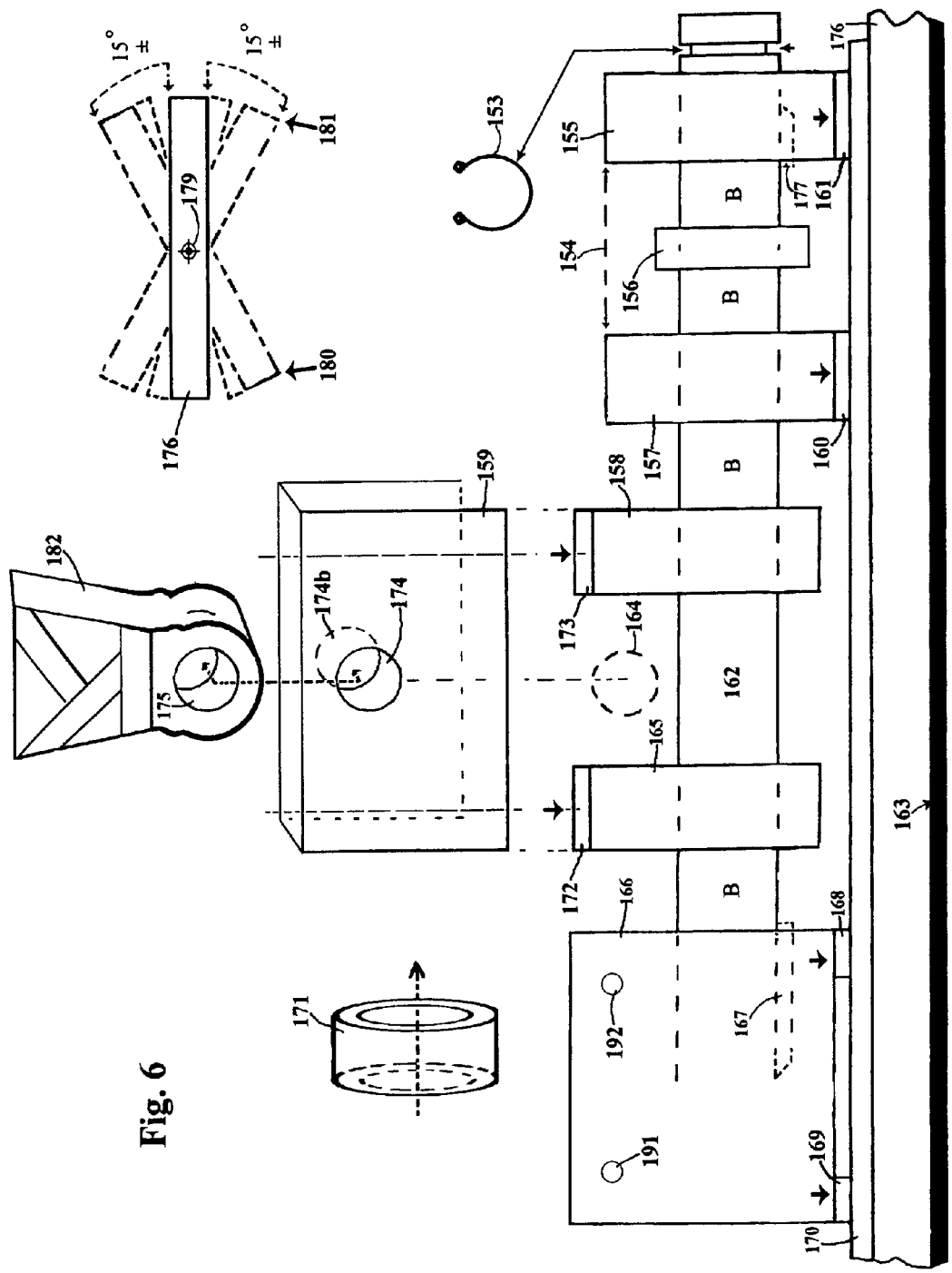
FIG. 6 shows an exploded cross-sectional partially fractured of snowmobile ski 176, mounted with a traction apparatus for engaging a snowmobile connecting member 182; a diagram (top right) of ski movements.
Figure 7:
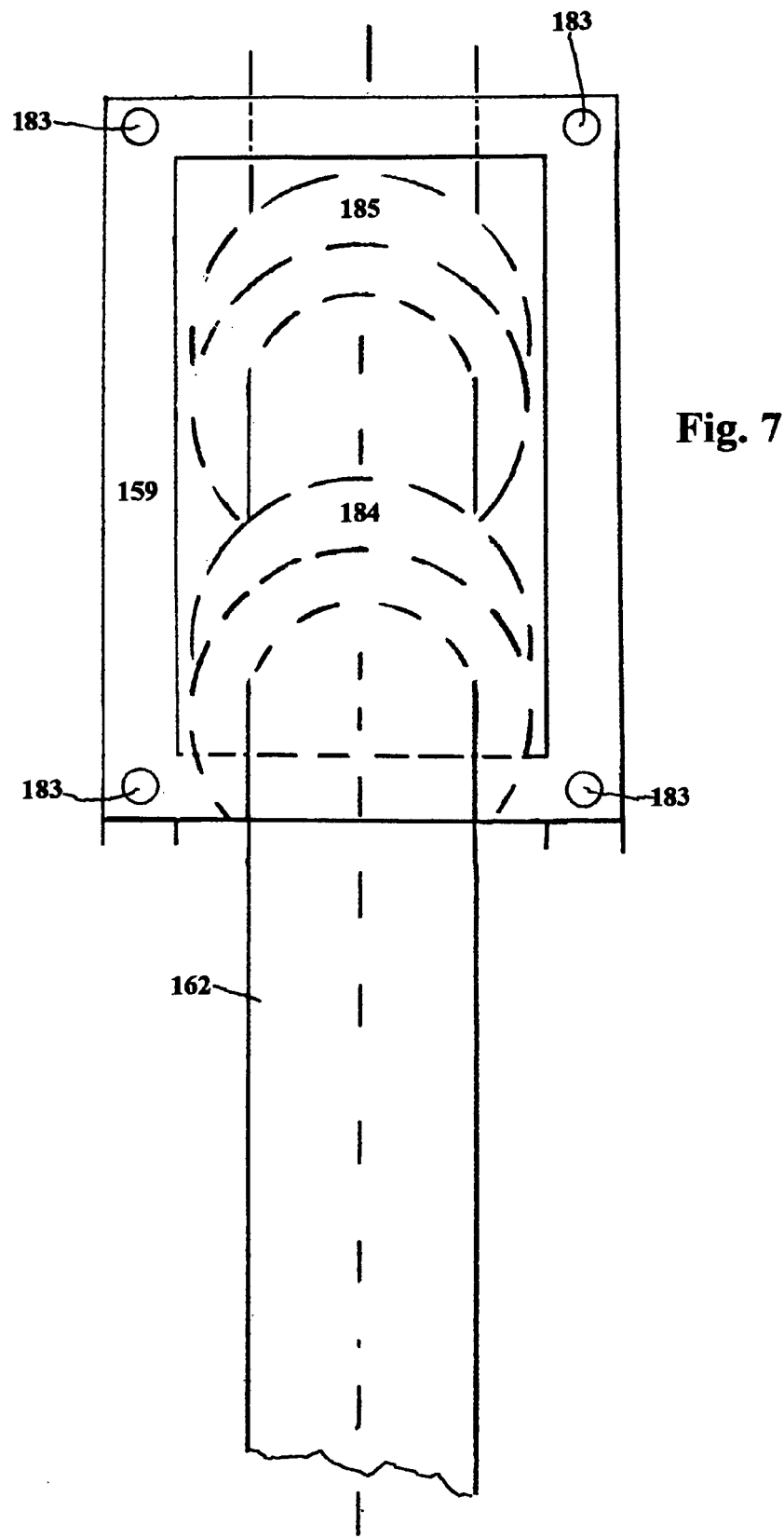
FIG. 7 shows an above view of a cover 159, and to 159 (FIG. 6), for engaging the traction apparatus to (FIG. 6); and other related parts with the snowmobile connecting member 182 to (FIG. 6).

More specific details of the apparatus described to FIG. 1 are to be found in FIG. 2; FIG. 3; FIG. 4; FIG. 5; FIG. 6; FIG. 7.

FIG. 2, shows a back-country ski 23 having a power automated traction apparatus sitting on, and at the for-front of a back-country ski binding system. The binding system is only for reference, and given a short description for a better understanding of the disposition and function of the apparatus, in con-junction with the binding system.

Toe binding 24, pivots on a shaft 55 that is held by pivoting part 56 that is held to the ski 23 by base plate 54 (part of 56) using screws 57 and 58 drilled into ski 23. The rear binding 29 having a boot retaining jaw 28 to lock the ski boot (not shown) between 24 and 29; herein the boot is supported by part 27 that moves accordingly with the toe binding 24. The traction apparatus is placed at the front of the toe binding 24 leaving sufficient free movement space so as not to interfere with metal cover 60 (that protects the components of the apparatus from exterior environment) that is held to the ski 23 by screws (not shown). The traction apparatus is placed in the above described position for climbing vertically having the added weight of the skier (not shown) to increase the contact of gripping part 26 with ice and ice covered snow surfaces (not shown). An exploded 3 dimensional view of 26 is shown top right of FIG. 2. Gripping part 26 made of material(s) (preferably aluminum for strength and light weight), has an extruded (X) shaped frame; wherein both ends of 26 are equal in every aspect and best described by the white(X) in a black circle that is a plastic bushing part 25. The X shaped end of 26 coming in contact with ice, and snow underneath ski base 40 (as shown in FIG. 2) creates the traction that prevents the ski 23 from sliding in any direction; on ice and especially on snow surfaces. This is because 26 sinks into the snow wherein the extruded part (between ends) of 26 forms a four sided (V) shape holding to the snow. This is clearly visible from the exploded dimensional view of 26. Gripping part 26 fits vertically into the groove (white X) of bushing part 25. Bushing part 25 fits firmly (snug) between position indicators 62. And is limited to position indicated by arrows 62; wherein 25 vertically traverses a predrilled hole in line with binding 24 of ski 23 (transparent view showing only griping part 26). Bushing 25 is cemented (using glue) on the barrel side inside the hole (said barrel side; area between position indicators 62) in ski 23. The top of 26 is spot welded to 64, 65, 67, 68, 69 of metal fixation plate 49 (exploded view of 49 middle right); then welded all around for strength. Fixation plate 49 sits flat on top of bushing part 25. Welding spots of fixation plate 49 correspond to the opposite side of fixation plate 49 to position other welding spots for holding metal parts as follows: Spring anchor stud 30 (above 65) having a hole to hock spring 31. Spring 31 reaches to spring anchor stud 32 that is spot welded to the underside of cover 33. Cover 33 is defined by a continual doted line reaching ski 23 on the left and right. Spring anchor stud 51 (above 68) for hocking spring 36. Spring 36 held by spring anchor stud 35 spot welded to underside of cover 33. Spring 31, and 36 are used to retract gripping part 26 when not in use. Stud 34 is spot welded to underside of cover 33 directly in line above metal anchor 39 welded on top of stud 50. 50 is spot welded at the other end to fixation plate 49; in line above position 69. Gripping part 26 is assigned a limited vertical travel distance that is indicated by a doted line 52 and is indicated by an arrow from doted line 52 to plate 49. The end part of 34 facing the top part of anchor 39 indicated by an arrow controls and determines the travel distance limit 52. And is achieved when 34 and 39 make contact as 26 is retracted by springs 31 and 36 and travels no further. This way the opposite end of 26 comes flush with the bottom end of bushing 25 (not shown) and flush with the ski base 40.

A load-rated wire rope lanyard 37 (known to the art) travels to and fro between anchor 39 and threaded nut 41. The load-rated wire rope lanyard 37 is fix into to anchor 39 attached to a threaded nut 41 that screws onto threads 42 of piston 61; secured into place by a threaded lock nut 43.

A single acting gas pneumatic actuator 44, operates and automates the gripping part 26 by pulling in the load-rated wire rope lanyard 37 via the piston 61, that lowers gripping part 26 into the desired traction position. The load-rated wire rope lanyard 37 is guided by a rectangle ringed threaded stud 47 that screws into a pre drilled hole (not shown) of ski 23; and is further guided by a metal Dowel pin 48 welded at one end to metal pulley 38; wherein the other chamfered end of 48 is set snug into a predrilled hole (not shown) into ski 23. A second pulley 59 held by stud 53 that is welded to position 63 on top of plate 49.

Notes: In the final Draft, if need be there may be added (not shown) (To further help guide the load-rated wire rope lanyard 37. A third pulley welded to a stud that is welded on top of fixation plate 49; set between 50 and 59. This arrangement can and may be added to the apparatus to further prevent slack of load-rated wire rope lanyard 37; as piston 61 extracts causing a slack of load-rated wire rope lanyard 37 between anchor 39 and pulley 38 (more precisely on top of pulley 59 has 39 raises to meet with 34. If this where to be necessary, then the load-rated wire rope lanyard 37 would have to pass underneath the said third pulley in order to firmly guide and prevent any slack or deviation of the prescribed course set forth to FIG. 2).

Actuator 44 is anchored on the ski 23 (anchored to ski not shown) via two pneumatic mounting brackets placed around the barrel; that is one next to port hole 45 and the other next to port hole 46. Both said pneumatic mounting brackets are held down on the ski 23 via screws.

To retract gripping part 26; the single acting gas pneumatic actuator 44 reverses direction of the load-rated wire rope lanyard 37 via piston 61 that self extracts, common with single acting gas pneumatic actuator (known to the art). The gripping part retracts from gripping position to doted line 52; and further helped along by springs 31 and 36, preventing slack of load-rated wire rope lanyard 37.

Single acting gas pneumatic actuator 44 is powered by carbon dioxide $CO_2$ pressurized gas cartridge 86 (FIG. 3).

Further explanation to FIG. 2 is to be found to FIG. 3.

FIG. 3, shows a pressurized carbon dioxide $CO_2$ gas cartridge 86 (top center) having threads 85 that screw into threaded (thread not shown) cup 82 (screws clockwise indicated by arrow, shown far right 86). A fractured view 81 shows cup 82 is part of bottom 80 inside cartridge holder 88. A flexible rubber cover 87 fits over 88 to prevent exterior elements infiltration. An exploded view 71 shows again cup 82. Hole 84 (covered by led seal not shown) is punctured by pype 188 that fits snug inside hole 84. Said puncture occurs as the Carbon dioxide $CO_2$ gas cartridge 86 is screwed securely into cup 82. On exterior underside of bottom part 80, of cartridge holder 88; is located a threaded hole 76 (shown far right ;thread not shown) that connects with threaded end 77 of a pneumatic elbow threaded-to-tube adapter 78 (known to the art); wherein the opposite end is a tube adapter 79.

The traction apparatus to (FIG. 2) will now be explained along side; and accordingly with the above first paragraph to FIG. 3.

Therefore proceeding.

In turn 79 connects with one end of a flexible pneumatic plastic tube (plastic tube indicated by arrows); and the opposite tube end connects with adapter 73 of the servo control-solenoid valve unit 74; using a pneumatic straight tube-to-thread adapter (not shown). The above paragraphs explains how the pressurized carbon dioxide $CO_2$ gas travels through the above arrangement to reach the servo control-solenoid valve unit 74.

In one aspect shown far left to FIG. 3, is an arrangement of components parts found underneath cover 60 to (FIG. 2) (that is not visible to FIG. 2) that powers the traction apparatus, for the back country ski to (FIG. 2); that comprising: a single acting gas pneumatic actuator 44 alongside to cartridge holder 88; containing $CO_2$ gas cartridge 86 inside (shown far right to FIG. 3) mounted with said rubber cover 87 not visible with (FIG. 2). The position of some components within the arrangement may vary in the final draft.

Said unit 74 is powered by DC voltage (battery) 75. A wire cable 186 connects 75 with unit 74 indicated by arrow. A tilt sensor 66 (known to the art) is fixed on top of the ski 23 (FIG. 2) (tilt sensor 66, fixed to ski not shown to FIG. 3). Said tilt sensor 66 is connected by wire cable 187 (indicated by arrow) with the servo control-solenoid valve unit 74. Said tilt sensor 66 acts as an on/off switch for 74. Tilt sensor 66 is adjusted (adjustment not shown) to switch on 74, for example: between 5 and 50 degrees of inclination (from plane); when the ski 23 (FIG. 2) is placed in a vertical ascending position (slope, raised terrain); and turns off unit 74 between 51 and 90 degrees inclination (from plane). Therefore when the ski to 23 (FIG. 2) is tilted sufficiently; the tilt sensor 66 switches on (activates) unit 74 that opens a solenoid valve inside 74 (valve not shown) via tube adapter 73. This action releases pressurized Carbon dioxide $CO_2$ gas from cartridge 86; said pressurized gas crossing into unit 74 (as explained earlier in paragraph one to FIG. 3; and therefore proceeding) and out through adapter 72 that is connected with a pneumatic straight threaded tube-to-tube adapter (adapter not shown), and at the opposite end of pneumatic tube (indicated by an arrow); that in turn connects to a pneumatic tube-to-threaded elbow (same as 78) that connects to port hole 46 of single acting pneumatic actuator 44, and 44 to (FIG. 2).This above described action retracts piston 61 that pulls in the load-rated wire rope lanyard 37 (FIG. 2) that lowers gripping part 26 (FIG. 2) to traction position.

When the ski to 23 (FIG. 2) returns to horizontal position, or encounters vertical descending terrain; the tilt sensor 66 will switch off unit 74 that will close the solenoid valve inside 74 cutting off the $CO_2$ gas pressure. This action will cause single acting pneumatic actuator 44 to self extract piston 61 that will reverse the direction of the load-rated wire rope lanyard 37 (FIG. 2) retracting griping part 26 (FIG. 2) as explained in the last paragraph to FIG. 2. The remaining $CO_2$ gas inside the single acting pneumatic actuator 44 will exit via port hole 45. Found on one side of metal cover 60 (FIG. 2); a vent hole 70 (FIG. 2) (indicated by a target sign) prevents any $CO_2$ gas pressure from building up inside said metal cover 60 (FIG. 2).

Note: All parts of cartridge holder 88 are made of metal, with the exception of rubber cover 87. The rubber cover 87 can be molded into shape. Cartridge holder 88 can be machined; then assembled part by part via threads or welded. It can and may be fabricated using a 3D printer or prototyped, from a digital 3D draft.

At least one of a pneumatic line filter/regulator (not shown); may be added to pneumatic tubing between 79 and 73. Said filter, controlling debris/humidity; said regulator controls gas pressure preventing pressure build up. Pneumatic line filter/regulator components are (known to the art).

FIG. 4, shows a left side (left foot use) leather hiking boot 137, having a rubber outsole 138, that are both parts of a pair of boots. The said pair of boots; wherein each boot as its own integrated power-automated traction apparatus; providing power-automated traction on ice, and ice covered snow surfaces (terrain). Although the right boot is not shown for practical reasons, It is part of; and as the same traction system as the left boot 137 of the present embodiment. The left Boot 137 was chosen, since one of the pair was needed to describe the said pair of boots; and to hopefully provide a clear understanding; and mention of the right boot only where differences occur between the pair.

Notes: Brief explanations and terms of the shell structure to boot 137, is given; along with specific details of the traction apparatus to boot 137. More specific shell structure details of boot 137, are to be found in the final assembling; explained in the few last paragraphs to FIG. 4. All and any solenoid valves inside any components, units, to FIG. 4 and (FIG. 5) are all indicated but not shown.

Most pneumatic adapters (fittings), inserts, grommets, screws, are explained but not shown for practical reasons. All are made of plastic except grommets are made of metal.

All hydraulic adapters (fittings) are made of metal; but not all are shown for practical reasons.

Proceeding with the description to FIG. 4.

Because of the opposite curvature (normal curvature found in foot wear in accordance with a right foot or left foot) of the right boot as opposed to the left boot 137; and of the configuration of the OUTSOLE 138, (the outsole is the term for boot sole; and is the part that comes in contact with the ground; and is known to the art) and of 138 to (FIG. 5).The components that make up the traction apparatus are therefore positioned oppositely for the right boot as opposed to the left boot 137; and the same is said for the outsole 138, and view showing the underside 138 to (FIG. 5). Each boots are insulated for cold weather as would be expected of any boot for winter use; therefore insulation is not shown. However insulation is briefly explained further on; where it becomes apparent that some parts of the apparatus to boot 13 pass through or lodge inside the insulation.

Boot 137 comprises: A radio receiver antenna 141 (an arrow points to antenna symbol) that is sewn (using material fiber threads to make double diamond stitches) into place, stitches 140 on the exterior leather lining of boot 137. Said antenna 141 is connected to a wire cable 101 (FIG. 5) that is connected to a unit 99 (FIG. 5) comprising: a receiver-servo-controller-solenoid valve. Said unit 99 (FIG. 5) is DC voltage powered; preferably by a single 6 volts battery; that is connected with, and placed inside the battery compartment 97 (FIG. 5); (Battery and connections between battery compartment and battery not shown). Unit 99 (FIG. 5) is connected to the battery compartment 97 (FIG. 5) via cable wire 93 (FIG. 5).

Said battery is not limited to 6 volts, or a single battery. A 6 volt rechargeable power pack (not shown) instead, and in place of said battery; can and may be used, having a plug (not shown) for recharging via the outsole 138. Unit 99 (FIG. 5), is grounded via wire 103 (FIG. 5) to 107 (FIG. 5).

An exterior source radio frequency transmitter; for example: an interface broadband communication system that can operate (transmit) from at least one of a; computer module, mobile phone, remote transmitter; that is used to switch on/off the traction apparatus via said receiver to unit 99 (FIG. 5). Unit 99 is preprogrammed via a computer; so it can execute commands to operate the traction apparatus. Note: the traction apparatus switches on/off simultaneously for each boot of the pair of boots via the same radio frequency signal emitted by the said transmitter. Most of the components, are found inside the outsole 138 (FIG. 5); and more specifically of area 134 (FIG. 5). Area 134 (FIG. 5) is limited to the south of fracture line 89 (FIG. 5) that is bordered to the north by the fractured view showing the underside of outsole 138 (FIG. 5); having LUGS 98 (FIG. 5), (Lugs -projecting part used for traction, known to the art).

NOTE: All of the parts, and explanation to the first paragraph to (FIG. 3) are now needed to fully understand and explain their use with FIG. 4 and (FIG. 5); and as stated in the first three lines of the "detail description of the invention."

A leather carrying compartment 144, held together by stitches 143; wherein stitches 143 are further sewed to the boot 137, showing 144 attached to the back end of 137. A leather carrying compartment 144, held together by double diamond stitched seams 143; wherein seams 143 are further sewed to the back end of UPPER 195 (the upper, known to the art; is the portion of boot above the outsole).

A transparent view showing hole 148, on the exterior underside bottom of 144 herein threaded end 77 (FIG. 3), of a pneumatic elbow threaded-to-tube adapter 78 (FIG. 3) enters and connects to hole 76 (FIG. 3) of a cartridge holder 88 (FIG. 3). Said 88 (FIG. 3) containing a pressurized carbon dioxide $CO_2$ gas cartridge 86 (FIG. 3); that fits snug inside 144. A rubber cover 87 (FIG. 3) fits onto 88 (FIG. 3) protecting 88 (FIG. 3) from exterior environment. Tube adapter end 79 (FIG. 3) of said 78 (FIG. 3) connects with one end of tube 130; wherein the opposite end of 130 enters through a two-piece metal grommet press mounted around hole (Grommet not shown) 146 (hole 146 indicated by a target sign) holding to the exterior leather lining of the upper 195. Herein silicon calking is used to seal any gapes around tube 130 and the Grommet so that no water, or debris gets inside the boot lining. A transparent view showing tube 130 (indicated by doted line with arrow ends) as it then continues down along insulation material(s) in between the exterior, and interior lining of upper 195 ; and through hole 132 (FIG. 5), indicated by a target sign inside the outsole 134 (FIG. 5).

An arrow pointing in the hole 132 (FIG. 5) indicates where the tube 130 (FIG. 5), came from(target sign 132 FIG. 4)); and connects via a tube-to -thread adapter port (port not shown) of receiver-servo-controller-solenoid valve unit 99 (FIG. 5). An arrow pointing to 99 (FIG. 5) indicates direction the carbon dioxide $CO_2$ gas is flowing inside tube 130 (FIG. 5). When the receiver of unit 99 (FIG. 5) captures said exterior radio frequency signal via antenna 141; activating unit 99 (FIG. 5), that switches on and begins to execute a sequence of preprogrammed commands. Said solenoid valve inside unit 99 (FIG. 5) opens via connecting port 100 (FIG. 5) sending pressurized carbon dioxide $CO_2$ incoming from tube 130 (FIG. 5) into a gas pneumatic double-vane rotary actuator 107 (FIG. 5); making the said rotor turn. The said $CO_2$ gas exits 107 (FIG. 5), via a pneumatic tube 142 (FIG. 5) having an arrow pointing in direction of gas flow (port hole and adapter for tube 142 (FIG. 5) not shown). Tube 142 (FIG. 5) crosses over tube 130 (FIG. 5) and enters into hole 102 (FIG. 5); A transparent view shows a doted line with arrow ends that indicates the pneumatic tube 142; passing in-between the exterior leather lining, and interior lining of upper 195; from hole 102 FIG. 4, (indicated by target sign) to said hole 139 (indicated by target sign). A two-piece metal grommet is press mounted around hole 139 (Grommet not shown); that is one part on the inside, and the other on the exterior of 139. The opposite end of tube 130 connects with a right angle tube-to-female adapter. The female end is positioned to exit from the interior to the exterior of grommet mounted hole 139. A male insert ring having a hole in the center where $CO_2$ gas exits the boot 137 (not shown) connects from the exterior onto to the female end. 139 is positioned high on the boot to help prevent exterior environmental elements from entering.

Gas pneumatic double-vane rotary actuator 107 (FIG. 5) having a metal shaft 105 (FIG. 5), that rotates; is connected to, and activates hydraulic oil double-vane pump 136 (FIG. 5). A metal frame that forms a visible rectangle around the perimeter of both 107 (FIG. 5), and 136 (FIG. 5); keeps them well aligned; emphasized by 106 (FIG. 5); and was put in place to prevents misalignment of shaft 105 (FIG. 5). Hydraulic oil double-vane pump 136 (FIG. 5) is feed hydraulic oil via hydraulic oil reservoir 135 (FIG. 5) wherein said hydraulic oil arrives via threaded-to tube adapter 147 (FIG. 5), connected with tube 120, connected to elbow tube-to-tube adapter 112 (FIG. 5), connected to tube 111 (FIG. 5). The opposite end of 111 (FIG. 5) connects (adapter not shown) to unit 190 (FIG.

5). Unit 190 (FIG. 5) comprising: a servo-control-multi-solenoid valves (known to the art; and having 4 internal valves not shown). Said unit 190 (FIG. 5) is powered and controlled by unit 99 (FIG. 5) and connects to 190 (FIG. 5) via wire cable 104 (FIG. 5). Unit 190 opens an inside valve adjacent to treaded-to-threaded adapter 110 (FIG. 5); herein hydraulic oil enters, pump 136 (FIG. 5). The hydraulic oil then exits pump 136 (FIG. 5) via threaded-to-threaded adapter 114 (FIG. 5) to re-entering unit 190 (FIG. 5) indicated by arrow. From unit 190 (FIG. 5) two separate hydraulic oil single acting cylinders comprising: 90 (FIG. 5), and 129 (FIG. 5). Said cylinder 90 (FIG. 5) containing piston 95 (FIG. 5), and cylinder 129 (FIG. 5) containing piston 96 (FIG. 5) wherein both said pistons extrude simultaneously; and is explained as follows.

Piston 95 (FIG. 5), (piston area limited via circle 91 (FIG. 5)) extrudes from incoming hydraulic oil pressure created by the pump 136 (FIG. 5); pushing hydraulic oil inside tube 108 (FIG. 5); connected to 190 (FIG. 5) via threaded-to-tube adapter (adapter not shown); in turn the opposite end of tube 108 (FIG. 5) connects to cylinder 90 (FIG. 5) via tube-to-threaded adapter 92 (FIG. 5). Hydraulic oil flow indicated by directional two-way arrow 109 (FIG. 5) of tube 108 (FIG. 5).

Piston 96 (FIG. 5) at the heal end; of the underside of outsole 138 (FIG. 5) is extruded (piston area limited via circle 121 (FIG. 5) from incoming hydraulic oil pressure created by 136 (FIG. 5); pushing oil inside tube 193 (FIG. 5); connected to 190 (FIG. 5) via threaded-to-tube adapter; in turn the opposite end of tube 193 (FIG. 5) connects to 129 (FIG. 5) via tube-to-threaded adapter 113 (FIG. 5). Hydraulic oil flow indicated by directional two-way arrow 115 (FIG. 5) inside tube 193.

Each piston 95 (FIG. 5), and 96 (FIG. 5) are each equipped with a gripping part 123 (FIG. 5). For practical reasons one gripping part 123 (FIG. 5) is not mounted to piston 95 (FIG. 5), to show threaded holes 94 (FIG. 5) (threads not shown) visible on the flat surface of piston 95 (FIG. 5) that are used to mount 123 (FIG. 5) to said pistons using screws (small Bolts) 122 (FIG. 5) that hold 123 (FIG. 5) via holes 124 (FIG. 5) firmly in place as shown via piston 96 (FIG. 5).

Pistons 95 (FIG. 5), and 96 (FIG. 5), both extrudes so that gripping parts 123 (FIG. 5), do not exceed but instead equal in length the rubber lug(s) 98 (FIG. 5). This way the lugs 98 (FIG. 5) of outsole 138 (FIG. 5) and gripping parts 123 (FIG. 5), together come in direct contact with a surface (terrain). This step will be explained in more detail as the outsole 138 develops further on.

Said gripping parts 123 (FIG. 5) are (X) shaped for a no slip on ice, and ice covered snow surfaces (terrain). Both traction parts to boot 137 can, and may be equipped with metal studs 189 (FIG. 5), (shown in an exploded view to (FIG. 5)); and mounted to gripping part 123 (FIG. 5) to the left of outsole 138 (FIG. 5) for example. An inserted stud 189 (FIG. 5) is screwed via threads 127 (FIG. 5) into a threaded hole (threaded holes for studs not shown) to 123 (FIG. 5). Using a key (key not shown) that fits the base part 125 (FIG. 5) via square sides 128 (FIG. 5), to mount said studs; tightening them no further then metal plate 126 (FIG. 5). An arrow points from the inserted stud to the exploded view of stud 189 (FIG. 5). This measure amplifies traction on ice.

Has explained earlier in paragraph 3-5 to FIG. 4; the receiver of unit 99 (FIG. 5) is preprogrammed to receives a command to turn on from said exterior radio frequency signal and so on. Therefore if now the receiver of unit 99 (FIG. 5) receives a command to turn off from said exterior radio frequency signal. Then unit 99 (FIG. 5) will before turning off; execute the following commands, according to the initial preprogram (as mentioned earlier in paragraph 3 to FIG. 4), and as follows. Will close interior solenoid valve adjacent to connecting port 100 (FIG. 5) cutting the $CO_2$ gas supply that turns rotor 107 (FIG. 5), off. In turn the pump 136 (FIG. 5) stops. Unit 99 (FIG. 5) then commands unit 190 (FIG. 5) to close internal solenoid valve adjacent to threaded-adapter-to-threaded adapter 114 (FIG. 5); dose internal valve that leads to adapter 110 (FIG. 5); dose internal valve adjacent to adapter 111 (FIG. 5). And open internal valve adjacent to threaded-to-tube adapter 117 (FIG. 5). Hydraulic oil pressure is now directed to flow via said 117 (FIG. 5) and pass into elbow tube-to-tube adapter 118 (FIG. 5) then into tube 119 (FIG. 5) and entering the hydraulic oil reservoir 135 (FIG. 5) via tube-to-threaded adapter 147 (FIG. 5). These actions relaxes, hydraulic oil pressure; from piston 95 (FIG. 5), and piston 96 (FIG. 5) causing them to self retract with the attached gripping parts 123 (FIG. 5). NOTE: The piston 95 (FIG. 5), and piston 96 (FIG. 5), both self retract because they are both parts of hydraulic single acting cylinders (known to the art), 90 (FIG. 5), and 129 (FIG. 5).

A fractures view emphasized by 131 (FIG. 5) showing an inside view of hydraulic oil reservoir 135 (FIG. 5); and that further shows the underside of the hydraulic oil reservoir tube adapter 133 (FIG. 5); that connects with hydraulic oil tube 149 (indicated by a doted line). A transparent view shows 133 FIG. 4, (indicated by a target sign). The other end of 149 connects to adapter 150. In turn 150 is partially threaded at one end; this end connects with threads 151 of FILLER BREATHER 152. Said 152 is twisted to unlock or remove so maintenance can be performed. For example: filling hydraulic oil reservoir 135 (FIG. 5) with oil via adapter 150. Air breather holes 193 of filler breather 152 ; are necessary for letting air pass in and out from the hydraulic oil reservoir 135 (FIG. 5); so that no vacuum is created that would result in inadequate operation of the hydraulic system.

A transparent view shows hydraulic tube 149 (doted line) reaching hole 145 ; (indicated by target sign). Adapter 150 mounted with filler breather 152 (FIG. 5) sticks out vertically from a the two-piece grommet press fitted (not shown) around hole 145 on the exterior lining of upper 195. Silicone calking seals any gapes between the two-piece grommet, and the exterior bottom part of adapter 150 keeping 150 firmly in place. Hole 145 is positioned high on the boot to help prevent exterior environmental elements from entering.

The final assembling of the boot shell, with the the traction apparatus for boot 137, is now explained.

Inside THE UPPER 195 (known to the art) know as the boot part without the sole part 138 of boot 137. Said upper 195 is preferably made of TOP-GRAIN leather for the exterior lining; having a mid-lining(s) forming the insulation); made of breathable fiber material(s);for example made of: nylon fiber(s), natural fiber(s) such as Bamboo. The interior lining is preferably made of MID-GRAIN leather. That said; the entire upper 195, can and may be made of synthetic breathable fiber material(s). Double-stitched (diamond) seams (example 143), used for their durability and strength are used throughout the upper 195. Other parts shown, boot tongue 178, lacing 198, eyelets for lacing 194, hocks for lacing 197.

A hard molded plastic MIDSOLE (not shown) covers the entire surface area that is the bottom part of said upper 195. Said midsole is pre molded. Herein (the mold) a rectangle opening is left in said midsole; so that when the midsole is placed at the bottom inside the upper 195; the said rectangle opening is immediately above the DC voltage battery compartment 97 (FIG. 5). An accessible door (not shown) also made of hard molded plastic fits flush over the said rectangle opening.

A BOOT-LAST (not shown, and know to the art) made of thermo set plastic material(s); that is a type of foot mold used to give the upper 195 its shape. This is achieved by placing the said midsole in the bottom part of the boot-last; then placing the boot-last inside the upper 195. Now the upper 195 is inserted over a heated press, and pressure is added. The south end of the upper 195 is folded over the exterior underside of said midsole. After this step; the outsole 138; having all the assembled and tested components to (FIG. 5), inside; 138, is then cemented (using glue) with the underside of the upper 195; (reference area 196). A removable foam INSOLE (not shown and known to the art) that provides foot comfort; is placed over the said midsole inside the upper 195.

The making of the OUTSOLE 138, of the boot 137; with the above described traction apparatus placed inside the mold (mold made of material(s).

Area 134 (FIG. 5) that surrounds hydraulic cylinder 90 (FIG. 5), and hydraulic cylinder 129 (FIG. 5) is filled with rubber compound(s) simultaneously with area 138 (FIG. 5), inside a mold; that encompasses the entire outsole 138 FIG. 4, and 138 FIG. 5). So that in the end once the outsole is unmolded; the underside will resembles area 138 (FIG. 5), having rubber LUGS 98 (FIG. 5), (LUGS are a projecting part, know to the art). Both hydraulic cylinders 90 (FIG. 5) and 129 (FIG. 5), are visible; although imbedded between 3 millimeters and 7 millimeters deeper (lower) than the flush part shown of outsole 138 to (FIG. 5). This way when piston 95 (FIG. 5), and piston 96 (FIG. 5) are extrude each with there respective mounted gripping parts 123 (FIG. 5); and will be flush with; therefore not exceeding in length the ends of the lugs 98 (FIG. 5) shown on the underside of 138 (FIG. 5). This way; increased traction is assured via gripping parts 123 (FIG. 5); yet providing a comfortable and natural contact with any ground, surface, ice, snow (terrain) ; as would normally be expected from a standard hiking boot. The only exception to this; is if the studs 189 (FIG. 5.) are mounted to gripping parts 123 (FIG. 5); increasing the traction ;and raising the gripping parts no more than 5 millimeters.

Notes:

Hydraulic oil reservoir 135 (FIG. 5) is made of molded plastic.

All gas pneumatic tubing, of boot 137 is flexible and of pneumatic grade; and all pneumatic adapters(Fittings) are of pneumatic grade.

All hydraulic tubing, of boot 137 is flexible and of hydraulic grade; and all tubing adapters (Fittings) are of hydraulic grade.

A small magnet is placed inside the hydraulic oil reservoir 135 (FIG. 5) for collecting metal debris from metal components wear of the boot traction apparatus.

Pressurized carbon dioxide $CO_2$ gas cartridge 86 (FIG. 3) are good for several discharges that may exceed 50 in number ;considering the small area (of boot 137) that is traveled by the gas that is needed to operate the gas pneumatic double-vane rotary actuator 107; and time it takes for the traction apparatus as a hole to extrude the gripping parts 123 (FIG. 5); and with the added benefit that hydraulic oil single acting cylinders 90 (FIG. 5), and 129 (FIG. 5) are self retracting; further reducing the use of pressurized carbon dioxide $CO_2$ gas.

An on/off switch positioned near 139 (FIG. 5) for controlling unit 99 (FIG. 5) can and may be added to the boot traction apparatus to the present embodiment.

The boot traction apparatus of the present invention can and may be controlled using an exterior infrared-transmitter to an infrared receiver unit inside area 134 (FIG. 5) instead of radio frequency receiver of unit 99 (FIG. 5).

Cartridge 86 (FIG. 3) containing pressurized AIR instead of pressurized carbon dioxide $CO_2$ gas; can and may be used.

The traction apparatus described including all the contents therein of 138 and 137 to FIG. 4 and to (FIG. 5) can and may adapt with artificial limbs; for example: android(s).

FIG. 6, shows a traction apparatus mounted on a snowmobile ski 176; wherein a fractured view of ski 176 (at each end of 176) is shown; and further showing a snowmobile attachment part 182. Each traction apparatus of a pair; are each mounted on a separate snowmobile ski of a snowmobile (snowmobile not shown). To provide a lucid understanding to the viewer; only one traction apparatus mounted on one ski 176, are shown. However the pairs of snowmobile skis each mounted with a traction apparatus will be explained together where it becomes obvious that the pairs are needed to proceed.

The snowmobile attachment part 182; and a snowmobile snowmobile engine steering column, rotary vane pump, electro-hydraulic pump system, electronic power steering system are used only as reference to the present embodiment.

However ski 176 to FIG. 6, and all that pertains to FIG. 6, and (FIG. 7) is part of the present embodiment. Excluding as mentioned, attachment part 182 FIG. 6.

Using bolts, fitted with lock washers(not shown); an Hydraulic double-vane rotary actuator 166, is fixed via holes indicated by an arrows via flange mounting parts 169, and 168 to a sturdy metal plate 170, that is between (5 millimeters and 10 millimeters thick; wherein said bolts fitted with washers engage said holes, then metal plate 170 via threaded hole immediately under said 169 and 168; that is two threaded holes facing the viewer to FIG. 6, and two other threaded holes at the back: opposite side(not shown).

Said Hydraulic double-vane rotary actuator 166, engages one end of a metal drive shaft 162. Both 166 and 162 are partially keyed (having a keyway) NOTE: (Shaft 162 is partially keyed near the opposite end as well; that is explained further on.). Key 167 is inserted inside the keyway (showing a transparent view of key 167 inserted into 166); interlocking 166 and 162 together. A polyurethane spacer 171, is fitted onto drive shaft 162 and is positioned in between 166 and 165 indicated by the letter (B) on drive shaft 162 (other spacers 171 are to be found along 162 indicated also with the letter (B). Said spacer 171 is also known as a recessed bumper, and are used for protecting parts from impact with one and other (and are known to the art). Following 171, are two equal sized square pillow block bearings 165 and 158 (pillow block bearing are known to the art). Leaving a space in between 165 and 158; that are both mounted with metal cover 159; wherein said cover 159 engages snowmobile attachment part 182, via hole 174, and 174b (of said cover 159) with hole 175 of snowmobile attachment part 182. Said 182 enters the cover 159, via an opening (that is visible) above cover 159 to (FIG. 7), in between 184 (FIG. 7) and 185 (FIG. 7) above the drive shaft 162 (FIG. 7). Holes 174 and 174b and 175 mach perfectly aligned to become (form) one hole 164; herein a metal supporting shaft threaded at both ends (this supporting shaft is not shown) engages hole 164 crossing from side to side, wherein the threaded ends of said supporting shaft overlap on each sides of cover 159. Said supporting shaft is fitted at both ends with plastic washers (not shown), followed by, flange-slotted-threaded nuts (not shown) one for each sides. Two cotter pins, one for each said flange-slotted-threaded nuts, that enters the slotted part of said flange-slotted-threaded nuts; crossing a pre drilled hole; one on each ends of said supporting shaft to lock in place the described assembly of parts that engages hole 164.

Cover 159 mounts over 165 and 158 (as specified earlier of paragraph two to FIG. 6) so that the bottom part of cover 159, ends flush with the bottom extremity of 165 and 158. Both the left side extremity, and right side extremity of cover 159 aligned flush; and match perfectly with the left side extremity of 165, and the right side extremity of 158; and is indicated by two doted lines. Both the cover 159 and the snowmobile attachment part 182, to FIG. 6, are shown from a slight angle, to show their dimensional shape. However, 159 and 182 are align perfectly square, placed inline with 165 and 158 before mounting them together. Cover 159 is securely engaged with 165 and 158 via 183 to (FIG. 7), using four metal bolts(not shown), each said bolt is fitted with a lock washer and metal washers(washers not shown); then put into holes 183 (FIG. 7); and secured into threaded holes immediately under holes 183 (FIG. 7). And further indicated by arrows to FIG. 6, via top of 172 of pillow block bearing 165, and via top of 173 of pillow block berring 158; not forgetting the other two threaded holes at the opposite side of said arrows to 172 and 173.

A space between snowmobile attachment part 182 and drive shaft 162 is assured by the exact proportions of cover 159 and positioning of hole 164; taking into account pillow block berring 165 and pillow block bearing 158. A polyurethane spacer 171 is inserted over drive shaft 162 and positioned in between 158 and pillow blocks bearing 157. Said 157 helps support drive shaft 162. Using bolts, fitted with lock washers (not shown); 157 is fixed via hole indicated by an arrow via flange part 160, to metal plate 170; wherein said bolts fitted with washers engage threaded hole indicated by an arrow; that is one threaded hole facing the viewer to FIG. 6, and an other threaded hole at the back: opposite side not shown).

Snowmobile ski 176, and the ski base 163 are both made of material(s).

For a plastic snowmobile ski. Said metal plate 170 is fixed to snowmobile ski 176 using bolts: and preferably flat head key locking bolts (Bolts not shown) that enter the underside of ski base 163 of snowmobile ski 176, via pre drilled holes, crossing from side to side of snowmobile ski 176 and base part 163; wherein the bolts engage metal plate 170 via threaded holes(not shown) for receiving them from the underside of metal plate 170, said flat head key locking bolts. The head part of said flat head key locking bolts enter flush with the underside of base 163 of snowmobile ski 176; and finish flush inside of plate 170.

If the snowmobile ski is made of metal; then metal plate 170 can be welded with the snowmobile ski 176, along the seams between 170 and 176; or secured using Flat head Bolts, as explained with method for plastic ski.

Proceeding along drive shaft 162; between pillow block bearing 157 and a shaft support block 155 a polyurethane spacer 171, is inserted over drive shaft 162 proceeded by a shaft collar 156, that is in turn proceeded by a polyurethane spacer 171. Said shaft collar 156 (known to the art) is fixed to drive shaft 162, via a recessed set screw (not shown). Shaft collar 156, provides both polyurethane spacers 171; positioned left, and right, of 156 a tight flange fit, that is: between 157 and 156. And between 156 and 155. Shaft support block 155 is fixed to 170 in the same way as 157. Shaft support blocks are known to the art.

Drive Shaft 162 traverses Shaft support block 155, and exits 155, to engage with an external retaining ring 153 via a groove indicated by arrows (ring 153 is a preventive measure). A centimeter after said groove the drive shaft ends. The drive shaft 162 is interlocked with Shaft support block 155; since 162 and 155 are both partially keyed. Key 177 is inserted inside the keyway (showing a transparent view of key 177 inserted into 155); interlocking 155 and 162 together.

Therefore, put in simple terms; the Hydraulic double-vane rotary actuator 166, and the shaft support block 155 rotate with the ski 176; but not the cover 159, and therefore not the snowmobile attachment part 182.

Furthermore only the berrings 184 (FIG. 7), and 185 (FIG. 7), rotate inside the pillow blocks 165, and 158. But not their pillow blocks. 157 is an essential part and preventive measure by supporting the drive shaft 162, so it does not bend from the weight of the snowmobile and passengers aboard.

FIG. 7, bearings 184, of pillow block 165 to (FIG. 6) and bearings 185, of pillow block 158 to (FIG. 6) are both shown without the pillow blocks; to hopefully give the viewer a clear understanding; about the movements of the drive shaft 162, in relation to the bearings 184, and 185, that turn in accordance to the drive shaft 162. And since the pillow blocks part of 165, and 158, don't move; but instead remain stable with the cover 159 and 159 to (FIG. 6), that holds, supports a snowmobile via the snowmobile attachment part 182 (FIG. 6); that is positioned above and between 184, and 185. This way the snowmobile ski 176 (FIG. 6) (see Diagram top right to (FIG. 6)); is enabled to pivot from side to side from the axis 179 (FIG. 6) (see target sign), synchronously with the drive shaft 162. For example: 15 degrees to the right of the axis, or 15 degrees to the left of the axis.

The Hydraulic double-vane rotary actuator 166 turns the drive shaft 162 in relation to the hydraulic oil pressure entering, said 166. That is, via port hole 191 (FIG. 6), and exiting via port hole 192 (FIG. 6); or the reverse: entering 192 (FIG. 6), and exiting 191 (FIG. 6). Hither way determines the direction the drive shaft 162 turns: clockwise or counterclockwise. This next step is determined by the hydraulic power steering system of a snowmobile, powered by the snowmobile engine.

Using hydraulic grade hose lines and hydraulic grade fittings that connect to port hole 191 (FIG. 6) and port hole 192 (FIG. 6); of the Hydraulic double-vane rotary actuator 166 (FIG. 6) of each apparatus to (FIG. 6) mounted on each of a pair of snowmobile skis of the present invention. And first connecting each ends of hydraulic lines coming from each port 191 (FIG. 6); connecting them to a hydraulic (T) adapter fittings. Then adding a hydraulic line to the remaining adapter end of said (T) fitting; and connecting the opposite end of said hydraulic line (having a adapter fitting to connect with) to the right side valve connecting port of the hydraulic oil double-vane rotary pump of a snowmobile. Then connecting each port holes 192 (FIG. 6) with the methods used for(connecting) port holes 191; but instead connecting the ports 192 (FIG. 6) with the left side valve connecting port of said pump.

Now that all is connected to a snowmobile; the direction that the snowmobile steering column is turning (is turned) determines the valve (said right valve or left valve) on said pump that will be sending hydraulic oil pressure accordingly to the designated port hole 191 (FIG. 6), or 192 (FIG. 6) of the Hydraulic double-vane rotary actuator 166. As mentioned earlier, the direction the steering column is turned; this will determine the direction the drive shaft 162 (FIG. 6) pivots; clockwise or counterclockwise. This way the pair of skis 176 (FIG. 6) will also pivot accordingly, and in synchronization with the drive shaft 162 (FIG. 6) of each apparatus (FIG. 6) mounted on each of the skis 176 (FIG. 6).

The Traction Produced by Each Mounted a Apparatus to (FIG. 6), on Each of a Pair of Snowmobile Skis is Explained:

As with all snowmobile skis, it is when tuning a curve that the traction is most needed; but is also the critical point, determining if the traction of the skis is good or bad.

Therefore, below describes a pair of snowmobile skis each mounted with the apparatus of the present invention in a turning situation.

The gravitational force exerted on each ski increases closer to the inbounds of the curved trajectory line as the skis tilt in accordance with a curved trajectory line; increasing traction of the pair of skis on snow (see diagram top right to (FIG. 6).

Traction on Ice is Explained.

The edge part of ski 176; shown where the arrow ends base part 163 (FIG. 6). See also Diagram top right (FIG. 6); that shows the edges to both sides of ski; 180 (FIG. 6) and 181 (FIG. 6). When the snowmobile skis are turning the edges of the skis are parallel to a curves trajectory line (cutting into the ice) that in turn increases traction of the skis; and the effect is furthermore amplified by the mass weight of the snowmobile that is shifted into the curve and exerted on the edge of the pair of skis has they are cornering on ice surfaces.

In an other aspect of the traction apparatus for snowmobile skis of the present invention.

The traction apparatus for snowmobile skis, can and may connect and operate with; an electro-hydraulic steering system; by connecting with the ports of solenoid valves of an electro-hydraulic rotary pump, with the hydraulic oil lines that are connected with 191 (FIG. 6) and 192 (FIG. 6) of 166 (FIG. 6).

Furthermore. The traction apparatus for snowmobile skis, can and may connect to operate with; an Electric power steering system. Wherein the Hydraulic double-vane rotary actuator 166 to (FIG. 6), is instead replaced by an Electric motor(not shown). This is done by aligning the electric motors drive shaft, with the drive shaft 162 (FIG. 6) and connecting them together using a keyed shaft coupling (not shown, and known to the art). But before fixing the said shaft coupling; adding polyurethane spacers 171 to (FIG. 6); one on each sides of the said keyed shaft coupling; followed by shaft collars similar to 156 to (FIG. 6), again one for each sides. This arrangement will protect parts from impact. Then connecting the electric motors wires to the said Electric power steering system using wire cable.

Notes to FIG. 6, and to FIG. 7:

The snowmobile ski 176 to (FIG. 6), wherein the pair of skis are made of plastic; can and may have metal blade edges (not shown), 180 (FIG. 6) and 181 (FIG. 6) along the sides of each skis; similar to blade edges on alpine skis.

Metal parts comprising: square pillow block part of 165 (FIG. 6), square pillow block part of 158 (FIG. 6), pillow block part of 157 (FIG. 6), the Shaft support block 155 (FIG. 6), the cover 159 (FIG. 6), and 159 to (FIG. 7); can and may preferably be made of aluminum to provide strength and light weight; and preferably each having a corrosion resistant zinc coating.

Pillow block bearing 157 (FIG. 6) can, and may be replaced by a Shaft support block, similar to 155 (FIG. 6).

Said polyurethane spacers are preferred over rubber for their abrasive resistance and support impacts from other parts even under low temperatures.

Said metal drive shaft 162 (FIG. 6), can and may preferably made of hard 1117 steel (known to the art), that is corrosion resistant to face the environment; and to resist the compounded weight of the snowmobile and passengers, and when applying the brakes, and for resisting to impacts' for example: when hitting bumps.

What is claimed is:

1. System for producing traction, wherein the traction system is at least one of an apparatus that provides traction on snow and ice covered surfaces, said system comprising:
    a traction apparatus adapted to each of a pair of footwear, each said apparatus having a pre-programmed first unit consisting of a, DC powered radio frequency-receiver-servo-control-solenoid valve unit, that is turned on by an exterior source radio frequency transmitter acting as an on/off switch; and
    captured by the receiver to opens the solenoid valve of the first unit; that controls incoming pressurized carbon dioxide gas from a cartridge, that
    powers a gas pneumatic rotary actuator powering a hydraulic vane pump feed hydraulic oil from a reservoir,
    said first unit controls a second DC powered solenoid-multi valves unit acting as an on/off switch that controls the inflow and out flow of oil pressure from the pump and reservoir;
    the oil pressure produced by the pump powers two hydraulic oil cylinders each having a piston wherein each piston is fixed with at least one of a
    gripping parts; that extrude from the underside of each footwear soles;
    said hydraulic cylinders are single acting type that self retract the pistons with said gripping parts when oil pressure is cut off.

2. The footwear apparatus to claim 1, wherein the apparatus is adapted for at least one of, boots, and shoes.

3. The first unit of footwear apparatus to claim 1, wherein said first unit is pre-programmed by computer.

4. The transmitter controlling the footwear apparatus to claim 1, wherein said transmitter is an interface broadband communication system, that operates from at least one of, mobile phone, and computer module, and remote control transmitter.

5. The footwear apparatus to claim 1, that is controlled by an on/off switch fixed to the exterior lining of the upper part of said footwear and linked to the first unit of the apparatus using wire cable.

\* \* \* \* \*